United States Patent
Howes (10) Patent No.: US 6,738,784 B1
(45) Date of Patent: May 18, 2004

(54) DOCUMENT AND INFORMATION PROCESSING SYSTEM

(75) Inventor: Simon L. Howes, Monroe, CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

(21) Appl. No.: 09/544,557

(22) Filed: Apr. 6, 2000

(51) Int. Cl.[7] .................. G06F 17/30; G06F 15/00; G06F 11/00
(52) U.S. Cl. .................. 707/104.1; 707/1; 707/200; 704/235; 704/260; 704/275; 704/257; 704/278
(58) Field of Search ................. 704/235, 260; 340/147; 364/900; 705/2; 707/10, 102, 104.1

(56) References Cited

U.S. PATENT DOCUMENTS

| | | | |
|---|---|---|---|
| 3,593,288 A | * 7/1971 | Bolick, Jr. .................. 340/147 |
| 4,260,854 A | 4/1981 | Kolodny et al. ........... 179/6.09 |
| 4,430,726 A | * 2/1984 | Kasday ..................... 364/900 |
| 5,146,439 A | * 9/1992 | Jachmann et al. ............. 705/2 |
| 5,265,075 A | 11/1993 | Bergeron et al. ............. 369/25 |
| 5,437,024 A | 7/1995 | French ..................... 395/600 |
| 5,481,645 A | 1/1996 | Bertino et al. ............. 395/2.79 |
| 5,517,405 A | 5/1996 | McAndrew et al. ........ 364/401 |
| 5,619,708 A | 4/1997 | Ho ............................. 395/767 |
| 5,664,109 A | 9/1997 | Johnson et al. ................. 705/2 |
| 5,772,585 A | 6/1998 | Lavin et al. ................. 600/300 |
| 5,823,948 A | 10/1998 | Ross, Jr. et al. ............ 600/300 |
| 5,857,099 A | 1/1999 | Mitchell et al. ............. 704/235 |
| 5,864,805 A | 1/1999 | Chen et al. .................. 704/235 |
| 5,903,864 A | 5/1999 | Gadbois et al. ............. 704/251 |
| 5,909,667 A | 6/1999 | Leontiades et al. ......... 704/275 |
| 5,920,835 A | 7/1999 | Huzenlaub et al. ......... 704/235 |
| 6,122,614 A | * 9/2000 | Kahn et al. ................. 704/235 |
| 6,192,345 B1 | 2/2001 | Chicorel ........................ 705/3 |
| 6,292,796 B1 | 9/2001 | Drucker et al. ................ 707/5 |
| 6,304,848 B1 | 10/2001 | Singer ........................ 702/181 |
| 6,317,700 B1 | 11/2001 | Bagne ........................ 702/181 |
| 6,581,038 B1 | 6/2003 | Mahran ........................ 705/3 |
| 2002/0095290 A1 | * 7/2002 | Kahn et al. ................. 704/260 |

OTHER PUBLICATIONS

Saha, The New Age Electronic Patient Record System, IEEE, 1995, pp. 134–137.

* cited by examiner

Primary Examiner—Frantz Coby
(74) Attorney, Agent, or Firm—Howrey Simon Arnold & White, LLP; Anthony L. Meola

(57) ABSTRACT

The invention relates to an information and/or document processing system. The information processing system includes at least one user input device, a transcription center at which voice files received from the at least one user input device are transcribed to text format and a natural language processing system receiving the transcribed voice files for analysis and processing. The natural language processing system applies knowledge based analysis for compiling the transcribed voice files. The system, further includes a dynamic experiential database processing the compiled and transcribed voice files to add value to the incoming information.

59 Claims, 4 Drawing Sheets

DOCUMENT AND INFORMATION PROCESSING SYSTEM

BACKGROUND OF THE INVENTION

1. Field of the Invention

The invention relates to an information processing system. More particularly, the invention relates to a document processing system operating through a remote public subscriber server accessible via a private and/or public network. The invention further relates to an information processing system generating experiential data based upon document information processed in accordance with the present invention.

2. Description of the Prior Art

Automated document preparation systems have been available for some time. These systems allow a plurality of individuals to dictate information to a transcription center where the dictated information is stored, transcribed and processed for distribution in accordance with a predetermined arrangement.

Such systems are commonly employed in the healthcare industry where physicians, nurses and other medical professionals are required to maintain detailed records relating to the status of the many patients they see during the course of their daily routine. With this in mind, the present specification is written with reference to the healthcare industry where specific examples are considered necessary for the sake of understanding the present invention. However, those skilled in the art will appreciate the far reaching applications contemplated to be within the spirit of the present invention.

Figure 1:
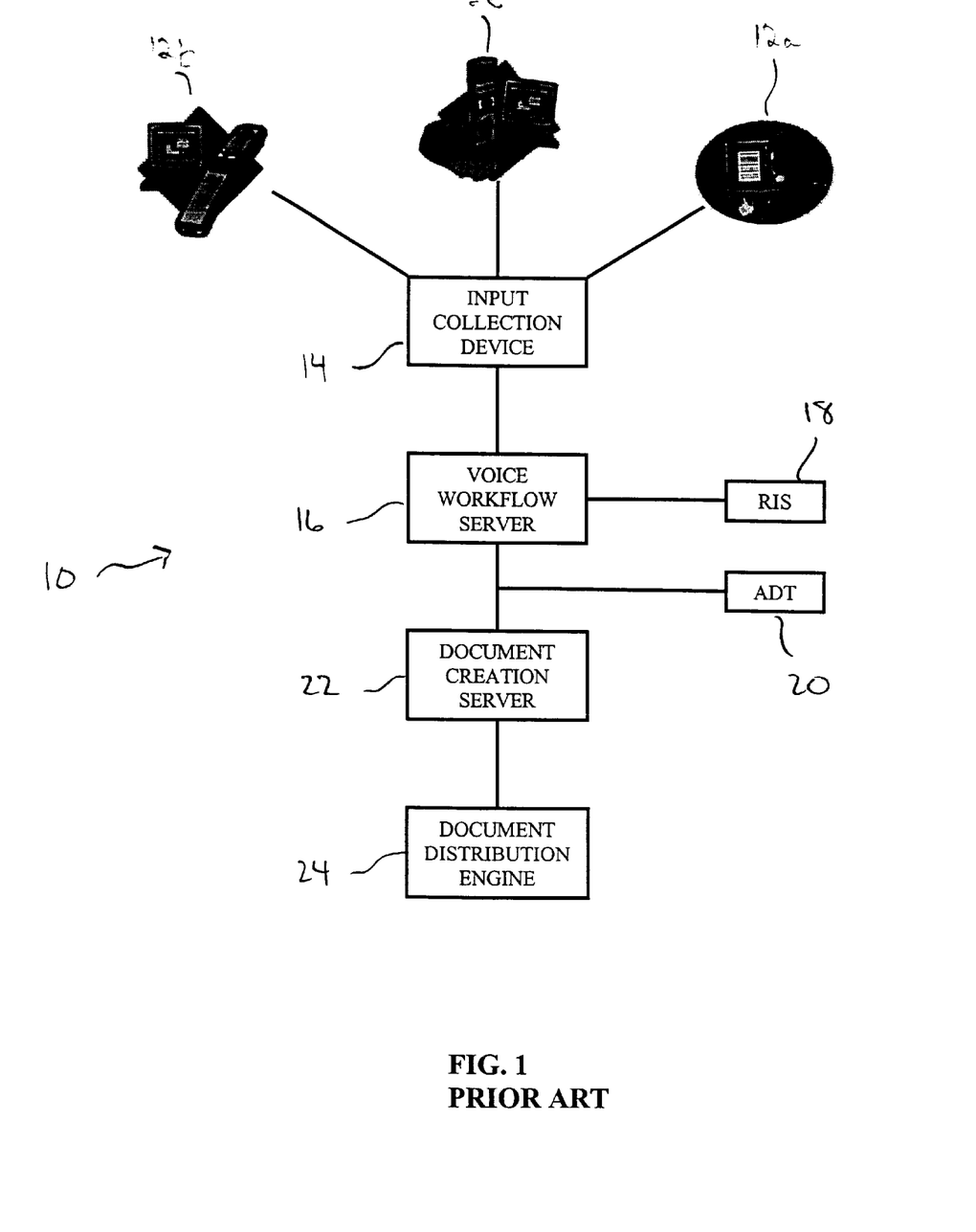
FIG. 1 is a schematic of a prior dictation/transcription system.

With reference to FIG. 1, a dictation/transcription system 10 currently offered by the assignee of the present invention is disclosed. The system 10 employs a variety of input devices 12a, 12b, 12c through which an individual may dictate information to the system 10. Such input devices may include, for example, a PC 12a, conventional voice based telephone transmissions 12b or wireless/mobile input devices 12c. In fact, a wide variety of input devices may be used so long as the input device provides the required information to the remainder of the system in a format understood by the system.

The information coming from the input device 12a, 12b, 12c is then stored in an input collection device 14 where the information is prepared for subsequent transcription. Specifically, the information is categorized by a voice workflow server 16 which interprets the dictated information to determine its priority, as well as special instructions relating to the dictated information. For example, the voice workflow server 16 may determine that further related information is available, and should be included in the file. As such, the voice workflow server is integrated with a radiology information system 18 capable of integrating radiological information with the information dictated by the individual.

The compiled information is then integrated with patient information via, for example, the admission discharge transfer database 20 of the medical center. This compiled information is then forwarded to the document creation server 22 where it is transcribed by a transcriptionist in a predetermined manner.

The compiled and fully transcribed document is then forwarded to a document distribution engine 24 which transmits the transcribed document, as well as any related information, to previously designated recipients.

While the currently available systems offer customers substantial convenience in the preparation of documents, the present system requires substantial investment on the part of healthcare facilities and other businesses which might choose to implement the system. Specifically, the system described above is designed for use by a single healthcare facility. The healthcare facility must, therefore, purchase, install, and maintain the hardware and software necessary to operate the dictation/transcription system. The healthcare facility must further train and update those individuals responsible for maintaining and operating the system. This represents a major investment in both time and money for an operation whose primary focus is the treatment of patients. As such, a continuing need exists for a more automated, convenient and operator friendly dictation/transcription system.

As with virtually all industries, the healthcare industry in particular is beset by a need for readily available information. From physicians to patients the ready availability of information is somewhat limited when one looks to the availability of information in other fields. While much of the known scientific information relating to medicine is available via public and/or private databases, the manner in which the data is gathered and analyzed is very similar to methods which have been utilized since the development of the printing press.

That is, physicians conduct research on an individual basis and publish reports telling of the information they have found through their research. The basis for their research is, however, usually information of which they have first hand knowledge or information which has been previously published by other physicians.

In addition to the limited availability of information for use by physicians, the available information regarding the practice of medicine is stored and prepared in an arcane manner not readily understandable by the conventional patient. As such, medical patients are often forced to rely entirely upon information given to them by their personal physicians, and consequently overlook alternate procedures which may be preferable to those suggested by their personal physician.

A need, therefore, exists for an information processing system offering improved document processing, as well as improved information collection, analysis and retrieval. The present invention provides such a system.

SUMMARY OF THE INVENTION

It is, therefore, an object of the present invention to provide a document processing system for subscription based dictation, transcription and document distribution. The system comprises a plurality of user input devices transmitting voice files from a plurality of distinct subscribers. The system also includes a transcription associated with a public subscriber server operated independently and remotely from the plurality of user input devices. The public subscriber server receiving voice files from the user input device and forwarding the voice files for transcription under a set of controlled rules. The transcription center transcribes the voice files received from the plurality of distinct subscribers and including a document distribution engine distributing transcribed documents in a manner prescribed by the subscriber.

It is also an object of the present invention to provide a subscription based dictation, transcription and document distribution method. The method is achieved by receiving voice files from a plurality of user input devices transmitting voice files from a plurality of distinct subscribers, operating a transcription center associated with public subscriber server independently and remotely from the plurality of user input devices, transcribing the voice files received from the plurality of distinct subscribers, and distributing the transcribed voice files in a manner prescribed by the subscriber.

It is another object of the present invention to provide an information processing system. The information processing system includes at least one user input device, a transcription center at which voice files received from the at least one user input device are transcribed to text format and a natural language processing system receiving the transcribed voice files for analysis and processing. The natural language processing system applies knowledge based analysis for compiling the transcribed voice files. The system, further includes a dynamic experiential database processing the compiled and transcribed voice files to add value to the incoming information.

It is a further object of the present invention to provide a dynamic medical experiential database. The dynamic experiential database includes a collection of related medical information compiled via an information processing system including at least one user input device, a transcription center at which voice files received from the at least one user input device are transcribed to text format, and a natural language processing system receiving the transcribed voice files in text format for analysis and processing wherein the natural language processing system applying knowledge based analysis for compiling the transcribed voice files. The collection of related medical information is processed to add value to the compiled and transcribed voice files.

It is yet another object of the present invention to provide a method for collecting, compiling and processing information. The method is performed by receiving voice files from at least one subscriber, transcribing the received voice files to text format, analyzing and processing the transcribed voice files using a natural language processing system applying knowledge based analysis for compiling the transcribed voice files and collecting the compiled transcribed voice files in a dynamic experiential database which processes the voice files to add value thereto.

It is still a further object of the present invention to provide end users with value added information by receiving voice files from at least one subscriber, transcribing the received voice files to text format, analyzing and processing the transcribed voice files using a natural language processing system applying knowledge based analysis for compiling the transcribed instructions and collecting the compiled transcribed voice files in a dynamic experiential database which processes the voice files to add value thereto.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 2:
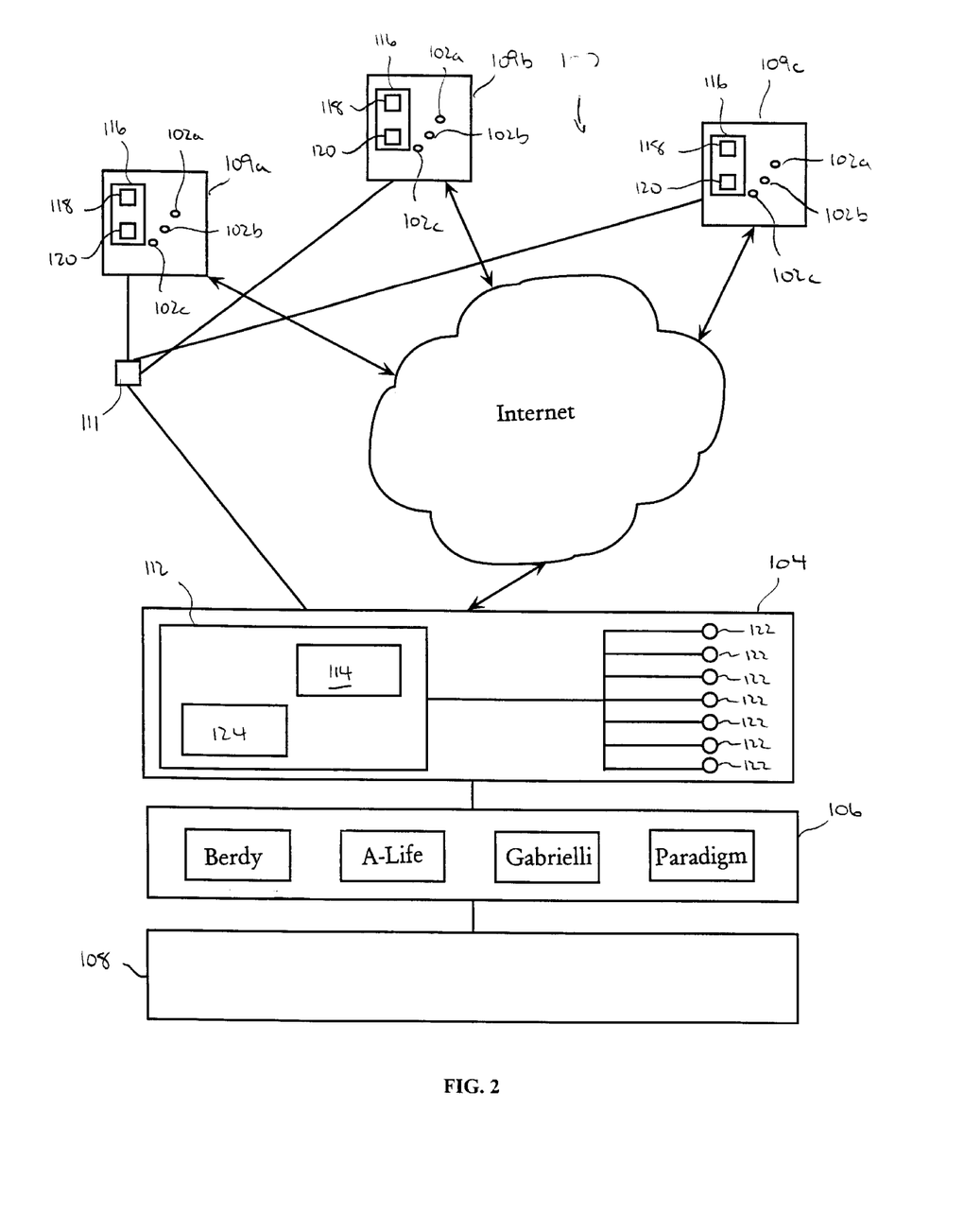
FIG. 2 is a schematic of the information system in accordance with the present invention.

With reference to FIG. 2, an information processing system 100 in accordance with the present invention is disclosed. The information processing system 100 includes at least one user input device 102a, 102b, 102c transmitting voice, data and/or text files, a transcription center 104 at which voice, data and/or text files received from the at least one user input device are processed for transcription to produce reports in predefined formats, a natural language processing system 106 applying knowledge-based analysis for processing and compiling the reports, and a dynamic experiential database 108 processing the information gleaned from the reports to add value to the incoming information. In accordance with a preferred embodiment of the present invention a plurality of user input devices 102a, 102b, 102c associated with a plurality of distinct subscribers 109a, 109b, 109c are linked with a public subscriber server 112 associated with the transcription center 104.

The present disclosure refers to voice, data and text files which are utilized by the transcription center 104 in the creation of predefined reports. As used herein these terms are employed in their broadest sense and should not be considered to limit the information which may be processed in accordance with the present invention. Specifically, a voice file is considered to refer to verbal instructions intended to be transcribed into text files at the transcription center 104. A data file is considered to be instructions associated with the voice file for identifying the appropriate report format, hospital information, patient information, physician information, etc.

Data files may be created in a variety of ways, including, but not limited to, speech recognition of voice commands intimately associated with the voice files or direct data input via a keypad associated with the input device. In accordance with a preferred embodiment of the present invention, and in accordance with common practice in the healthcare industry, it is contemplated that the data files will likely be created via speech recognition of voice commands intimately associated with the voice files.

Text files are a human-readable sequence of characters and the words they form that can be encoded into computer-readable formats, such as ASCII. Text is usually distinguished from non-character encoded data, such as voice files in the form of bitmaps and program code.

The present invention uses a variety of input devices which are generally conventional in nature. For example, dictation may be input to the transcription center 104 via a physical workstation 102a, telephone communications 102b or a mobile/wireless communication device 102c. Each of these input devices allows for the direct transmission of required voice and data files for later transcription at the transcription center 104. In addition, the physical workstation also allows for the transmission of text files which may be processed in conjunction with the voice and data files to create the desired predetermined reports. While these three input devices are disclosed for use in accordance with a preferred embodiment of the present invention, other input devices, or combinations thereof, may be employed without departing from the spirit of the present invention.

In accordance with a preferred embodiment of the present invention, Dictaphone Inc. offers an array of user input devices which may be implemented in accordance with the present invention. For example, devices similar to Dictaphone's Boomerang® Enterprise Edition and Walkabout™ Express may be implemented in accordance with the present invention.

Figure 3:
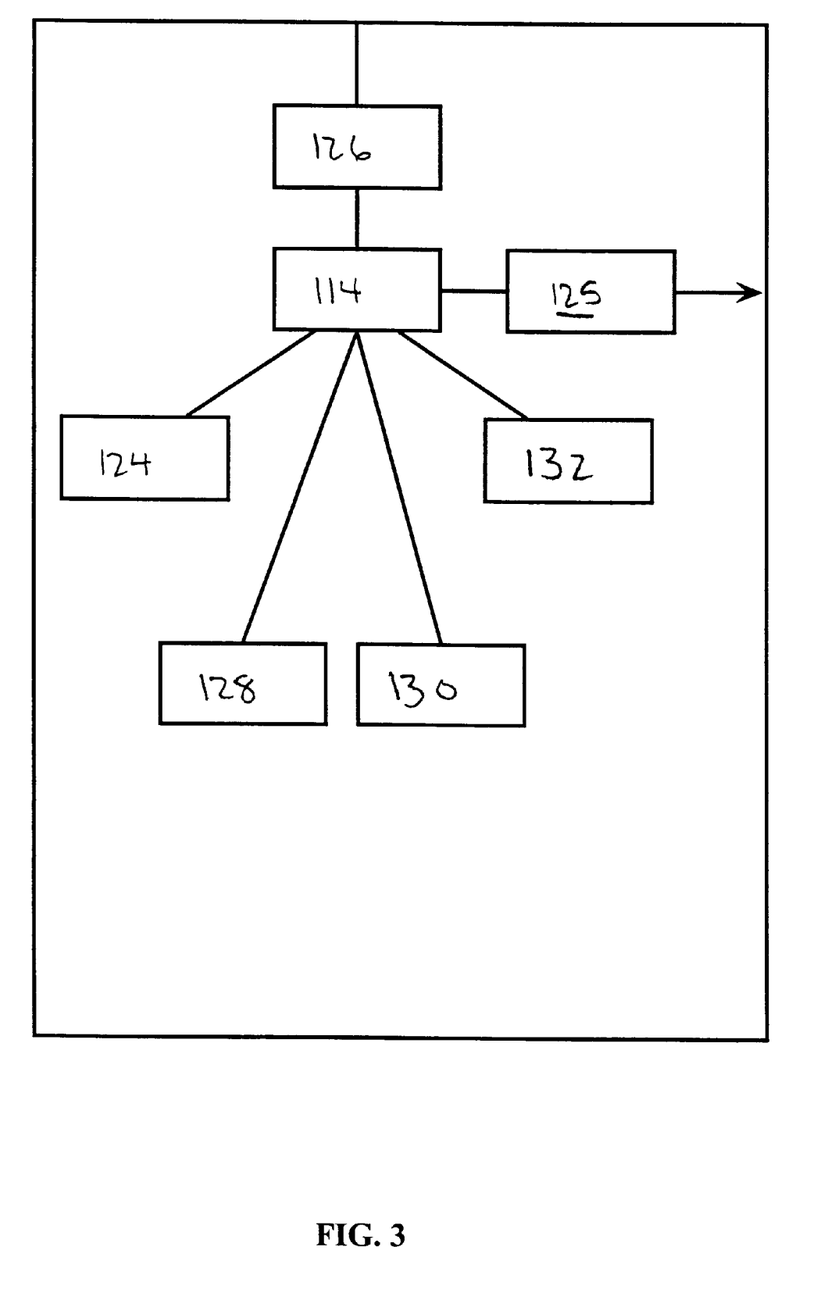
FIG. 3 is a detailed schematic of the public subscriber server.
Figure 4:
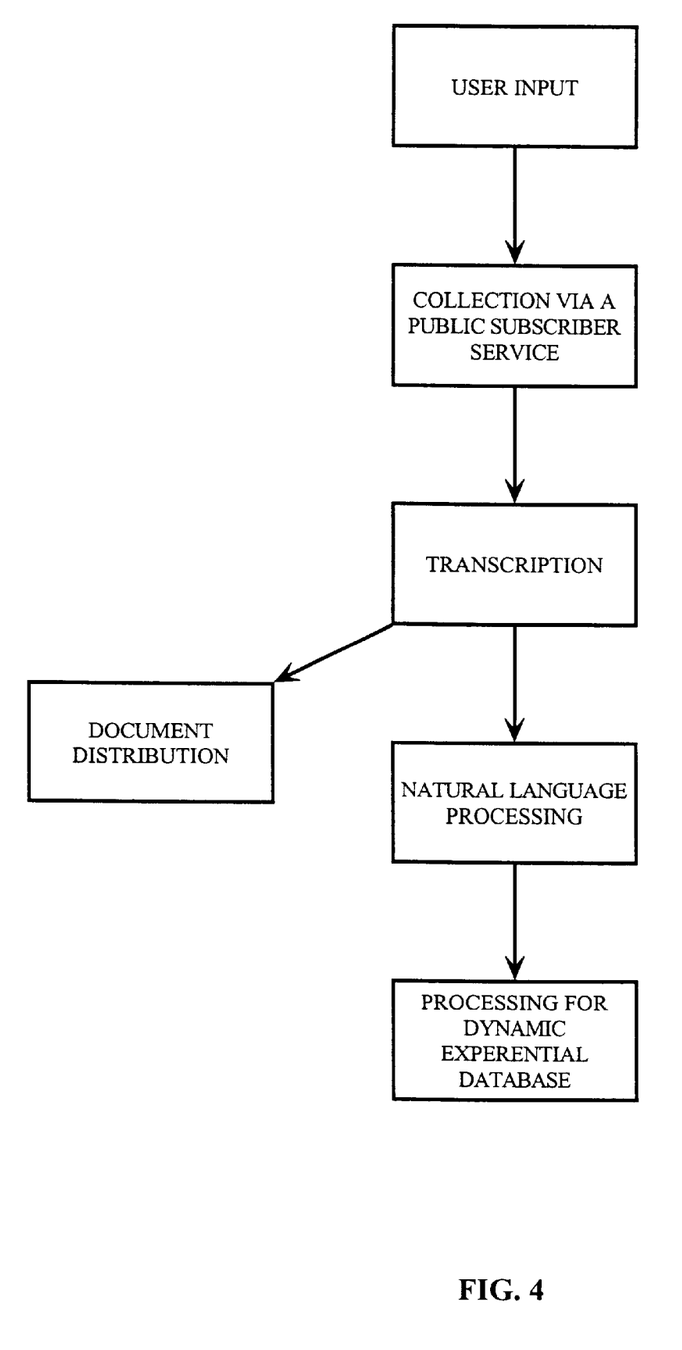
FIG. 4 is a flow chart of information and/or document processing in accordance with the present invention.

With reference to FIGS. 2 and 3, voice, data and text files input via any of the input devices are first transmitted to a public subscriber server 112 located at the transcription center 104. While the public subscriber server 112 in accordance with a preferred embodiment of the present invention is located at the transcription center 104, those skilled in the art will readily understand that the subscription server 112 need not be physically located at the same location as the other components of the transcription center 104 but may be located remote from the other components of the transcription center 104 and linked therewith via a local area network, wide area network, or other network.

In addition, the public subscriber server is referred to as being singular throughout the body of the present specification. However, those skilled in the art will readily appreciate that the public subscriber server described in accordance with the present invention may take various forms, including development based upon a plurality of linked servers, without departing from the spirit of the present invention.

Transmission between the input devices 102a, 102b, 102c and the public subscriber server 112 is preferably performed via the Internet 110 or conventional telephone landlines 111. Where the Internet 110 is utilized, the voice files are preferably transmitted using Voice Over IP (VoIP). VoIP is a term used in IP telephony for a set of facilities for managing the delivery of voice information using the Internet Protocol (IP). In general, this means sending voice information in digital form in discrete packets rather than in the traditional circuit-committed protocols of the public switched telephone network (PSTN). A major advantage of VoIP and Internet telephony is that it avoids the tolls charged by ordinary telephone service. In addition to IP, VoIP uses the real-time protocol (RTP) to help ensure that packets get delivered in a timely way.

The public subscriber server 112 is therefore provided with a "VoIP device" (such as Cisco's AS5300 access server with the VoIP feature) at its gateway. The gateway receives the packetized voice files transmitted from user input devices and then routes them to other parts of its network (local area or wide area network) or, using a T-1 or E-1 interface, sends them over the public switched telephone network.

Where the Internet 110 is utilized, the data and text files are transmitted using TCP/IP (Transmission Control Protocol/Internet Protocol). TCP/IP is currently the basic communication language or protocol of the Internet. TCP/IP is a two-layered program. The higher layer, Transmission Control Protocol, manages the assembling of a message or file into smaller packets that are transmitted over the Internet and received by a TCP layer that reassembles the packets into the original message. The lower layer, Internet Protocol, handles the address part of each packet so that it gets to the right destination. Each gateway computer on the network checks this address to see where to forward the message. Even though some packets from the same message are routed differently than others, they'll be reassembled at the destination.

The public subscriber server 112 of the present invention is adapted for use by a plurality of unrelated subscribers. By providing a subscription based transcription system in accordance with the present invention, subscribers are relieved of the burden of maintaining their own dictation/transcription system and may, therefore, concentrate upon their actual business. As such, it is contemplated that the present system 100 will hold special appeal to smaller clinics and group practices which may not be able to justify the acquisition of a dedicated system as discussed above in the "Background of the Invention". In addition, the receipt of voice, data and text files from a wide variety of subscribers facilitates the collection and maintenance of the information necessary to create the dynamic experiential database 108 discussed below in substantial detail.

Once properly routed from the user input device 102a, 102b, 102c, the voice, data and text files are stored within the public subscriber server 112 awaiting further processing. The public subscriber server 112 includes an enterprise commander 114 which coordinates the further processing of the transmitted files. This enterprise commander 114 is controlled through the adaptation of a system similar to Dictaphone's Enterprise Express. Generally, Enterprise Express is an enterprise-wide medical records workflow management system. Enterprise Express is built on Microsoft® Windows NT® Server and SQL Server technology, and supports all standard communication protocols. Enterprise Express consists of a suite of software applications that enable physicians and medical records departments, as well as other facilities requiring document processing, to efficiently create and process voice narrative into electronic records.

Specifically, the enterprise commander 114 provides control over the scheduling and routing of the voice files for transcription; reporting and accounting functions; adding, modifying and deleting users; and configuring and monitoring the system. The enterprise commander 114 may add users to the system and provide such users with various options. These options may be modified by the enterprise commander 114 and users may be removed from the system. Inquiries and reports on users are available to enterprise commander 114.

The enterprise commander 114 also has the capability to configure the system to meet local requirements. For example, voice ports may be configured to accept proprietary devices or PBX connections. The system parameters such as reserve voice capacity, cost factors, and alarm conditions may be set as needed. Statistics including date and time, Voice File utilization, estimated turn around time, and other performance measures are available via the enterprise commander 114.

Despite using a public network such as the Internet, the present system 100 provides the strongest authentication process available to prevent unauthorized people from unlawfully logging into the public subscriber server via the Internet or intercepting data transmissions. A 128-bit SSL digital encryption certificate by RSA (Rivest-Shamir-Adleman) resides on the authentication module 126 at the entry point to the public subscriber server 112. These digital certificates are electronic files that validate an individual's identity. When a user of logs into the public subscriber server 112, before any information is transferred, the digital certificates software on the user's input device 102a, 102b, 102c sends an encrypted session to the authentication module 126 of the public subscriber server 112. If the user's identity cannot be validated, entry is denied. If the user's identity is validated, the authentication module 126 sends a public key to the user interface device 102a, 102b, 102c.

All transmissions from the point of validation until the end of the session are encrypted with triple-DES algorithms, the highest level of encryption recognized by the National Security Agency. In order to decrypt each transmission, the authentication module 126 uses a proper key that is unique to the log-in session.

In addition to ensuring the security the present system 100, the public subscriber server provides a dedicated backup module 128 for effectively safeguarding critical data; 24 hours a day—7 days a week. The backup module 128 offers full management of the data backup process. As part of the backup process, database servers 130 maintained at the public subscriber server 112 and linked with the backup module 128 are backed up on a regular basis. New information is backed up every night and all information is backed up every week within the public subscriber server 112. For added safety, all files are backed up to an alternate location every two weeks.

The public subscriber server 112 also provides for dictation, or voice file, recovery. The recovery software module 132 provides the ability to recover dictation to prevent data loss. For example, as a physician dictates, voice files are continuously recorded on a local hard drive (not shown) maintained on the user input device 102a, 102b, 102c. If, for instance, the physician is interrupted midstream or navigates off of the page, the PC fails or the Internet connection is lost, the work won't be lost. The voice files are automatically recovered from the local hard drive. When the recording is finished, the encrypted voice files are sent to the public subscriber server 112 and removed from the local hard drive.

The network utilized in implementing the present system 100 is highly reliable and provides optimum performance. It is contemplated that an Exodus network be used in accordance with a preferred embodiment of the present invention, although a variety networks may be used without departing from the spirit of the present invention.

The public subscriber server 112 also acts to retrieve information, for example, forms, patient information, hospital information etc. for inclusion with the report to be dictated. The public subscriber server 112 is instructed to retrieve specific information necessary for the completion of predetermined reports based upon information found in the data files previously discussed. Where the data files are in the form of voice instructions, the voice instructions are first converted to data files using speech recognition software. The converted data files are then applied by the public subscriber server 112 in retrieving appropriate information. In the case of a system used in the healthcare field, information from the hospital based database 116 is accessed by the public subscriber server 112 to facilitate management of the server database and the transcription of the voice files corresponding to dictation jobs representing various medical reports. For example, the public subscriber server 112 may retrieve patient, hospital and physician information from a hospital information system 118 maintained locally at the hospital. In addition, the public subscriber server 112 may retrieve radiology and other diagnostic information from a radiology information system 120 maintained locally at the hospital.

In use, upon the receipt of voice, data and/or text files from the user input device 102a, 102b, 102c, the public subscriber server 112 accesses the hospital database 116 to update the patient records to reflect the present status of the dictation jobs and corresponding medical report. Where the present system 100 is implemented with the use of actual transcriptionists 122, assignment of the transmitted instructions to a transcriptionist 122 is recorded by the public subscriber server 112 and the hospital database 116 is updated with the relevant to information such that the hospital database 116 is consistently updated as to the status and content of the report submitted to the present system 100 for transcription.

As mentioned above, and upon receipt of the transmitted instructions, data files associated with the voice file are interpreted to identify relevant information which must be retrieved from the hospital database 116. Based upon the information identified in the attached data files, the public subscriber server 112 retrieves the appropriate patient and physician data (e.g. patient name and social security number, etc., physician name and ID number, etc.) for the particular report type as also identified in the data files accompanying the voice file requiring transcription.

Once the voice file is ready for transcription, either via speech recognition as is discussed below in substantial detail or by an actual transcriptionist, the public subscriber server 112 merges the patient and physician data with the identified report type (also identified by the data files). These report types are maintained at the public subscriber server 112.

In view of the subscribers' choice of having the voice file transcribed either by speech recognition software or an actual transcriptionist, the present system 100 offers subscribers either draft document processing or complete document processing. Draft document processing offers cost efficient and rapid "draft report processing. The voice files are simply converted to text over a secure Internet connection using sophisticated continuous speech recognition engines maintained at the public subscriber server 112. These speech recognition module 124 is discussed below in substantial detail. The resulting draft is then be returned electronically to the subscribers' medical record department (or any other selected location) for editing and distribution. This options offers subscribers a flexible and cost effective alternative to traditional transcription methods.

In contrast to the options offered via draft document processing, the system 100 is also capable of offering complete document processing. Specifically, complete document processing offers a complete outsourcing document transcription service for subscribers who choose to have their dictation not only transcribed (by either speech recognition software or an actual transcriptionist), but also edited, formatted and returned completed.

Once the information necessary for the completion of the dictated report is fully retrieved, the public subscriber server 112 forwards the voice file for transcription. In accordance with a preferred embodiment of the present invention, the transcription is achieved through the application of speech recognition software. The speech recognition software uses various algorithms to convert the digital voice files stored at the public subscriber server 112 into text files which may be subsequently reviewed by the individual presenting the document processing request, or a transcriptionist responsible for the review of documents produced via the application of the speech recognition software.

Where the voice file is to be transcribed through the use of speech recognition software, the voice file is processed by a speech recognition module 124 programmed with software adapted to transcribe the voice file to a text file. As mentioned above, and prior to transcription by the speech recognition software, the public subscriber server 112 interprets the data file to identify the required report form to be used in accordance with the specific transcription. The previously retrieved patient and physician data is then merged with the appropriate form and transcription moves forward. Where the public subscriber server 112 identifies the need for additional information for the completion of the designated form, the open architecture offered by the present system 100 permits the public subscriber server 112 to readily access a variety of information sources for the retrieval of the required information.

Transcription is then performed. It is contemplated that a variety of speech recognition software may be employed in accordance with the present invention. For example, systems are currently available from Lernout & Hauspie, Philips and Dragon Systems. Regardless of the system used in accordance with the present invention, the voice or data files will be applied to determine the appropriate language model for placing the dictated materials in their proper context. For example, the terminology and context use by radiologists is different from that used by surgeons. The speech recognition software will note this difference to better transcribe the voice files applied thereto.

Where an actual transcriptionist 122 is transcribing the voice file, the public subscriber server 112 forwards the relevant voice file to the word processor of the transcriptionist 122. The word processor also receives the patient and physician data, as well as the identification of the report type. The word processor uses the received report type to retrieve information identifying the proper format for the identified report type from a file of report formats stored locally at the word processor or at the public subscriber server 112, and merges the patient and physician data with the identified format and displays the merged information. Thus, the initially displayed report form will include necessary information which is already in the system database; relieving the transcriptionist 122 of the need to transcribe that information, and the dictator of the need to originally provide it.

As can be seen from the above description, it is preferred that word processors store files of the formats for each report type to be processed in accordance with the present invention. However, it is also within the contemplation of the subject invention that the report formats could be maintained by the public subscriber server 112 and the merged information transmitted to the word processor, avoiding the need and expense of maintaining storage for these files at each work station.

The word processor would respond to sign-on by the transcriptionist 122 to update the job record and send it to the public subscriber server 112. The public subscriber server 112 would then update the patient records again to reflect the current status of the corresponding medical report. The dictation system then outputs the dictation job voice file to the selected one of work stations in a conventional manner for transcription. At this point, the transcriptionist 122 would transcribe the voice file into the displayed format in a conventional manner, using the word processor to create the text and transcription unit to access the voice file. The word processor loops through while the dictation system loops through until the transcriptionist 122 is satisfied that the voice file has been properly and accurately transcribed into the display format. At this time the transcriptionist 122 would sign-off and signal the public subscriber server 112 that transcription was completed through the word processor.

Whether the voice file is transcribed via speech recognition software or an actual transcriptionist 122, text files transmitted by the user input device 102*a*, 102*b*, 102*c* may be incorporated in the prepared report at any point in the transcription process.

In summary, the public subscriber server 112 acts to order the input request for transcription, assign appropriate transcriptionist and/or method for transcription, and coordinate the retrieval of information associated with each document processing request. The public subscriber server 112 functions listed above are neither meant to be limiting nor exhaustive of those functions performed by the public subscriber server in initiating and performing the transcription of documents in accordance with the present invention.

Where transcription is performed through the use of speech recognition software, the speech recognition software module 124 of the public subscriber server 112 transcribes the voice files to usable text files with only the need for the intervention of a transcriptionist to proof the document once the speech recognition module 124 has completed its transcription. As the technology associated with speech recognition software continues to improve, it is contemplated that the need for a transcriptionist to review the automatically transcribed document will cease to exist.

Once fully converted to text form, and placed on the proper form, the prepared report is used for various purposes. In accordance with conventional transcription services, the text file, formatted into a predetermined report form with appropriate information appended thereto, is distributed via a document distribution engine 125 to various locations in accordance with a predetermined system arranged by the subscriber. Distribution is highly automated in accordance with known technology and may include e-mail, facsimile, telephone notification or regular mail.

In accordance with the present invention, the prepared report, which is substantially composed of a text file, is forwarded to a natural language processor 106 to compile information which may be subsequently used to enhance document processing and information retrieval. More specifically, the report is generally processed by a natural language processor 106 link with a text normalization processor. The natural language processor 106 and text normalization processor act upon the report to compile relevant information necessary to those working in a specific field.

Briefly, the information directly compiled via the natural language processor 106 is used in providing for coding compliance, automatic report compilation, structuring of reports to provide information in a user friendly format and treatment outcome information. For example, the natural language processor 106 allows the present system 100 to offer subscribers post report processing/coding services using natural language processing and knowledge based coding rule sets to analyze text and assign highly accurate ICD-9/CPT reimbursement codes, without the need for human involvement.

The system 100 will also provide web based electronic medical records services which organize freeform dictation transmitted in the form of voice files in the manner discussed above into a structured medical record accessibly over the Internet through a conventional browser based PC interface. Some of the many applications for this technology include: electronic clinical charting and patient documentation; physician report viewing and electronic signature capabilities; access to information by referring physicians; as well as review of valuable clinical information in a structured data format created by the present system's natural language processing technology. This service is also integrated with health information or data feeds for hospital information systems and/or practice management systems to make the process of creating patient charts more productive and accurate.

More specifically, various natural language processors working with text normalization processors are implemented to take full advantage of the information being generated via the present information processing system 100. In accordance with a preferred embodiment of the present invention, the transcribed reports are analyzed by Berdy SmartClinic™ and/or SmartVoice™. These systems developed by Berdy Medical Systems allow for the conversion of medical data via voice recognition software and text normalization to readily provide physicians with useful information in a format immediately ready for use by the physician.

It is also contemplated that the present system 100 may use systems such as A-Life's LifeCode as an aid in proper coding. Specifically, diagnoses and procedures described in medical records are represented by values from a complex set of numerical codes established by the World Health Organization and the American Medical Association. These codes are used to submit claims for payment and to gather quantitative information about the patient encounter. They are critical since they are often the only way physicians and other providers communicate with those that pay for their services.

There are many thousands of both ICD-9 codes that represent diagnoses and CPT codes that represent procedures. LifeCode uses natural language processing to perform medical coding for billing purposes. Specifically, the LifeCode coding engine is capable of emulating how a human coder reads and codes medical records. The system extracts information from medical reports and automatically assigns all relevant codes and billing modifiers.

Other systems employing natural language processing to refine information generated via the transcription process include Gabrielli (manufactured by Computer Based Medicine, Inc.) for the extraction of relevant data and Paradym (manufactured by Paradigm Integration Inc.) for in-patient coding.

After compiling the relevant information from the reports generated via transcription, the data is fed to a dynamic experiential database 108 which processes the same to add value thereto. For example, and in the case of the present system 100 being used in the processing of medical information, vast quantities of medical information will be generated by the present system 100. As physicians, nurses and other medical personnel prepare reports via the present system 100, the dictated reports are prepared and the documents generated thereby are disbursed in accordance with the predetermined wishes of the subscriber. Beyond the mere generation of dictated documents, the present system 100 employs natural language processors in conjunction with a controlled medical vocabulary text normalization process to compile material information which may be subsequently utilized.

Specifically, much of the information generated in accordance with the dictation/transcription process disclosed above is processed via known natural language processor systems, for example, Berdy, A-Life, Gabrielli, Paradym, to generate defined information. Much of this defined information is immediately implemented in providing physicians with indexed reports, procedures automatically coded for transmission to insurance companies etc.

The dynamic experiential database 108 of the present system 100 takes the compiled information generated by the natural language processors and stores the same for processing to create value-added information. As used herein the term "value added" information relates to information developed from multiple sources such that the resulting information provides a benefit not provided by a single source only.

It is contemplated that the value-added information may integrate specific related experiences which would have otherwise gone unnoticed. For example, when physicians seek advice regarding the handling of matter, they generally seek out advice from local physicians with whom they have a professional relationship. As such, physicians are somewhat isolated from many of their colleagues. The present dynamic experiential database 108 allows physicians to combine their experiences with those of their remotely located colleagues living across the country or in another country.

The present experiential database 108 compiles the experiences of medical professionals from around the country or world to provide a comprehensive collection of information which may be readily accessed and utilized by healthcare professionals without the need for studying a series of conflicting publications to determine a proper course of action. For example, the experiential database 108 will compile the experiences of thousands of physicians in treating sore throats with high fever to suggest a variety of courses of action with annotations regarding their upside and downside.

The dynamic experiential database also provides physicians with procedural advice based upon the stored experiences of other practitioners. For example, where a physician isolates a variety of symptoms, the dynamic experiential database might present the physician with alternate diagnoses to consider.

Similarly, the present experiential database 108 will be open to the public, therefore, allowing patients to readily research illnesses for alternate treatments not suggested by their physicians. The information provided by the experiential database 108 stands in stark contrast to the information available by researching medical treatises and publications which often add more confusion in a patient's attempt to identify alternate modes of treatment.

By unlocking all the valuable information currently trapped in paper records, the experiential database 108 enables intelligent, confidential use of clinical patient information. Currently, medical records provide unprocessed, raw information. The present system 100 places that information at the physicians' fingertips. Using natural language processing in conjunction with the present dynamic experiential database 108, the present system 100 transforms electronic text into normalized medical terminology and discrete data for analysis by physicians, hospitals or third parties. The result is the present system's unprecedented capability to aggregate anonymous data from diverse healthcare organizations to provide a rich database for clinical analysis. Practical application include, but are not limited to, automatic coding, chronic disease analysis, quality reporting, and physician/hospital decision support.

With the forgoing in mind, the present system 100 offers physicians and hospital organizations, as well as other organizations requiring information processing, more controlled over the information which they create. The present system 100 offers physicians and healthcare organizations increased controlled over both the cost and the process of creating, managing and analyzing patient medical records. The present system 100 accomplishes this goal by providing a series of online services for medical records production and analysis, based upon previously unknown integration of Internet, voice, and natural language technologies. The system 100 may generally the thought of as a suite of online services for medical records production and analysis. These services automate the process of creating and managing patient medical records. As a result, subscribers can reduce the inefficiencies of creating patient reports while more effectively utilizing the clinical information contained within those reports.

It is contemplated that the present system 100 will transform healthcare information management by lowering costs with reduced inefficiencies, enabling access to clinical knowledge for analysis, and helping to relieve the market pressures to increase and improve documentation. The present system 100 was built on the premise that the present two-way Internet exchange of voice, text, data and knowledge will have a profound and long-term effect on the creation, management, and distribution of patient information.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A document processing system for subscription based dictation, transcription and document distribution, comprising:
   a plurality of user input devices transmitting voice files from a plurality of distinct subscribers;
   a transcription center associated with a public subscriber server operated independently and remotely from the plurality of user input devices, the public subscriber server receiving voice files from the user input devices and forwarding the voice files for transcription under a set of controlled rules;
   the transcription center transcribing the voice files received from the plurality of distinct subscribers,
   a text processor applying knowledge based analysis post transcription for compiling the transcribed voice files according to the set of controlled rules, and
   the transcription center including a document distribution engine distributing transcribed documents in a manner prescribed by the subscriber.

2. The document processing system according to claim 1, wherein the transcription center transcribes the voice files via speech recognition software.

3. The document processing system according to claim 1, wherein the transcription center includes transcriptionists for transcribing the voice files.

4. The document processing system according to claim 1, wherein the text processor provides for coding compliance.

5. The document processing system according to claim 1, wherein the text processor provides for automatic report compilation.

6. The document processing system according to claim 1, wherein the text processor provides for the structuring of reports.

7. The document processing system according to claim 1, further including a dynamic experiential database.

8. A subscription based dictation, transcription and document distribution method, comprising:
   receiving voice files from a plurality of user input devices transmitting voice files from a plurality of distinct subscribers;
   operating a transcription center associated with a public subscriber server independently and remotely from the plurality of user input devices, the public subscriber server receiving voice files from the user input devices and forwarding the voice files for transcription under a set of controlled rules;
   transcribing the voice files received from the plurality of distinct subscribers;
   processing the transcribed files with a text processor applying knowledge based analysis post transcription for compiling the transcribed voice files according to the set of controlled rules; and
   distributing the transcribed voice files in a manner prescribed by the subscriber.

9. The method according to claim 8, wherein transcription is performed via speech recognition software.

10. The method according to claim 8, where in transcription is performed by transcriptionists.

11. The method according to claim 8, wherein the text processor provides for coding compliance.

12. The method according to claim 8, wherein the text processor provides for automatic report compilation.

13. The method according to claim 8, wherein the text processor provides for the structuring of reports.

14. The method according to claim 8, further including the step of creating a dynamic experiential database based upon the information compiled by the text processor.

15. An information processing system, comprising:
   at least one user input device;
   a transcription center at which voice files received from the at least one user input device are transcribed to text format;
   a text processing system receiving the transcribed voice files for analysis and processing, the text processing system applying knowledge based analysis post transcription for compiling the transcribed voice files; and
   a dynamic experiential database processing the compiled and transcribed voice files to add value to the incoming information.

16. The information processing system according to claim 15, wherein the transcription center transcribes the voice files via speech recognition software.

17. The information processing system according to claim 15, wherein the transcription center includes transcriptionists for transcribing the voice files.

18. The information processing system according to claim 15, wherein the text processing system provides for coding compliance.

19. The information processing system according to claim 15, wherein the text processing system provides for automatic report compilation.

20. The information processing system according to claim 15, wherein the text processing system provides for the structuring of reports.

21. The information processing system according to claim 15, wherein the information processing system processes information relating to the a health care industry.

22. The information processing system according to claim 21, wherein the dynamic experiential database compiles experiences of a medical profession to provide a comprehensive collection of information which may be readily accessed and utilized.

23. The information processing system according to claim 22, wherein the dynamic experiential database suggests a variety of courses of action with annotations.

24. The information processing system according to claim 22, wherein the dynamic experiential database provides procedural advice based upon stored experiences of other practitioners.

25. The information processing system according to claim 22, wherein the dynamic experiential database provides for automatic coding.

26. The information processing system according to claim 22, wherein the dynamic experiential database provides for chronic disease analysis.

27. The information processing system according to claim 22, wherein the dynamic experiential database provides for quality reporting.

28. The information processing system according to claim 22, wherein the dynamic experiential database provides for physician/hospital decision support.

29. A dynamic medical experiential database, comprising:
a collection of related medical information compiled via an information processing system including at least one user input device, a transcription center at which voice files received from the at least one user input device are transcribed to text format, and a text processing system receiving the transcribed voice files in text format for analysis and processing, the text processing system applying knowledge based analysis post transcription for compiling the transcribed voice files;
the collection of related medical information being processed to add value to the compiled and transcribed voice files.

30. The dynamic medical experiential database according to claim 29, wherein the dynamic experiential database suggests a variety of courses of action with annotations.

31. The dynamic medical experiential database according to claim 29, wherein the dynamic experiential database provides procedural advice based upon stored experiences of other practitioners.

32. The dynamic medical experiential database according to claim 29, wherein the dynamic experiential database provides for automatic coding.

33. The dynamic medical experiential database according to claim 29, wherein the dynamic experiential database provides for chronic disease analysis.

34. The dynamic medical experiential database according to claim 29, wherein the dynamic experiential database provides for quality reporting.

35. The dynamic medical experiential database according to claim 29, wherein the dynamic experiential database provides for physician/hospital decision support.

36. A method for collecting, compiling and processing information, comprising the following steps:
receiving voice files from at least one subscriber; transcribing the received voice files to text format;
analyzing and processing the transcribed voice files using a text processing system applying knowledge based analysis post transcription for compiling the transcribed voice files;
collecting the compiled transcribed voice files in a dynamic experiential database which processes the voice files to add value thereto.

37. The method according to claim 36, wherein voice files are received from a variety of distinct subscribers.

38. The method according to claim 36, wherein healthcare information is collected, compiled and processed.

39. The method according to claim 36, wherein the dynamic experiential database suggests a variety of courses of action with annotations.

40. The method according to claim 36, wherein the dynamic experiential database provides procedural advice based upon stored experiences of other practitioners.

41. The method according to claim 36, wherein the dynamic experiential database provides for automatic coding.

42. The method according to claim 36, wherein the dynamic experiential database provides for chronic disease analysis.

43. The method according to claim 36, wherein the dynamic experiential database provides for quality reporting.

44. The method according to claim 36, wherein the dynamic experiential database provides for physician/hospital decision support.

45. The method according to claim 36, wherein the text processor provides for coding compliance.

46. The method according to claim 36, wherein the text processor provides for automatic report compilation.

47. The method according to claim 36, wherein the text processor provides for the structuring of reports.

48. A method for providing end users with value added information, comprising the following steps:
receiving voice files from at least one subscriber;
transcribing the received voice files to text format;
analyzing and processing the transcribed voice files using a text processing system applying knowledge based analysis post transcription for compiling the transcribed instructions; and
collecting the compiled transcribed voice files in a dynamic experiential database which processes the voice files to add value thereto.

49. The method according to claim 48, wherein voice files are received from a variety of distinct subscribers.

50. The method according to claim 48, wherein healthcare information is collected, compiled and processed.

51. The method according to claim 48, wherein the dynamic experiential database suggests a variety of courses of action with annotations.

52. The method according to claim 48, wherein the dynamic experiential database provides procedural advice based upon stored experiences of other practitioners.

53. The method according to claim 48, wherein the dynamic experiential database provides for automatic coding.

54. The method according to claim 48, wherein the dynamic experiential database provides for chronic disease analysis.

55. The method according to claim 48, wherein the dynamic experiential database provides for quality reporting.

56. The method according to claim 48, wherein the dynamic experiential database provides for physician/hospital decision support.

57. The method according to claim 48, wherein the text processor provides for coding compliance.

58. The method according to claim 48, wherein the text processor provides for automatic report compilation.

59. The method according to claim 48, wherein the text processor provides for the structuring of reports.

* * * * *